United States Patent [19]

Scholl et al.

[11] 3,954,351

[45] May 4, 1976

[54] LIQUID LEVEL RESERVOIR CONTROL

[75] Inventors: Charles H. Scholl, Vermilion; Alan B. Reighard, Bay Village, both of Ohio

[73] Assignee: Nordson Corporation, Amherst, Ohio

[22] Filed: Dec. 27, 1974

[21] Appl. No.: 536,731

[52] U.S. Cl. .................................. 417/40; 137/413; 222/146 HE
[51] Int. Cl.² .......................................... F04B 49/00
[58] Field of Search ...................... 417/40, 46, 401; 137/413; 222/146, 146 HE, 67

[56] References Cited
UNITED STATES PATENTS

| | | | |
|---|---|---|---|
| 2,570,694 | 10/1951 | Langenbahn | 417/40 |
| 2,698,710 | 1/1955 | Pedroia | 417/401 |
| 3,364,861 | 1/1968 | Nilsson | 417/46 |
| 3,601,146 | 8/1971 | Reighard | 137/413 |
| 3,758,003 | 9/1973 | Kautz | 222/146 |

*Primary Examiner*—William L. Freeh
*Attorney, Agent, or Firm*—Wood, Herron & Evans

[57] ABSTRACT

A device for sensing and controlling liquid level in a reservoir container. The device includes a sensing element in the form of a displacer which enters the liquid through the surface and displaces a predetermined volume. The displacer is located in a surge tank into which the liquid is initially fed and from which it is supplied to the reservoir. The displacer is mounted on an arm of a lever, the displacer being counterbalanced to respond to a liquid level in the surge tank. The lever carries a switch actuating mechanism which is moved in response to a change in the liquid level in the surge tank and which controls actuation of a single acting piston pump air motor to supply liquid to the surge tank.

15 Claims, 4 Drawing Figures

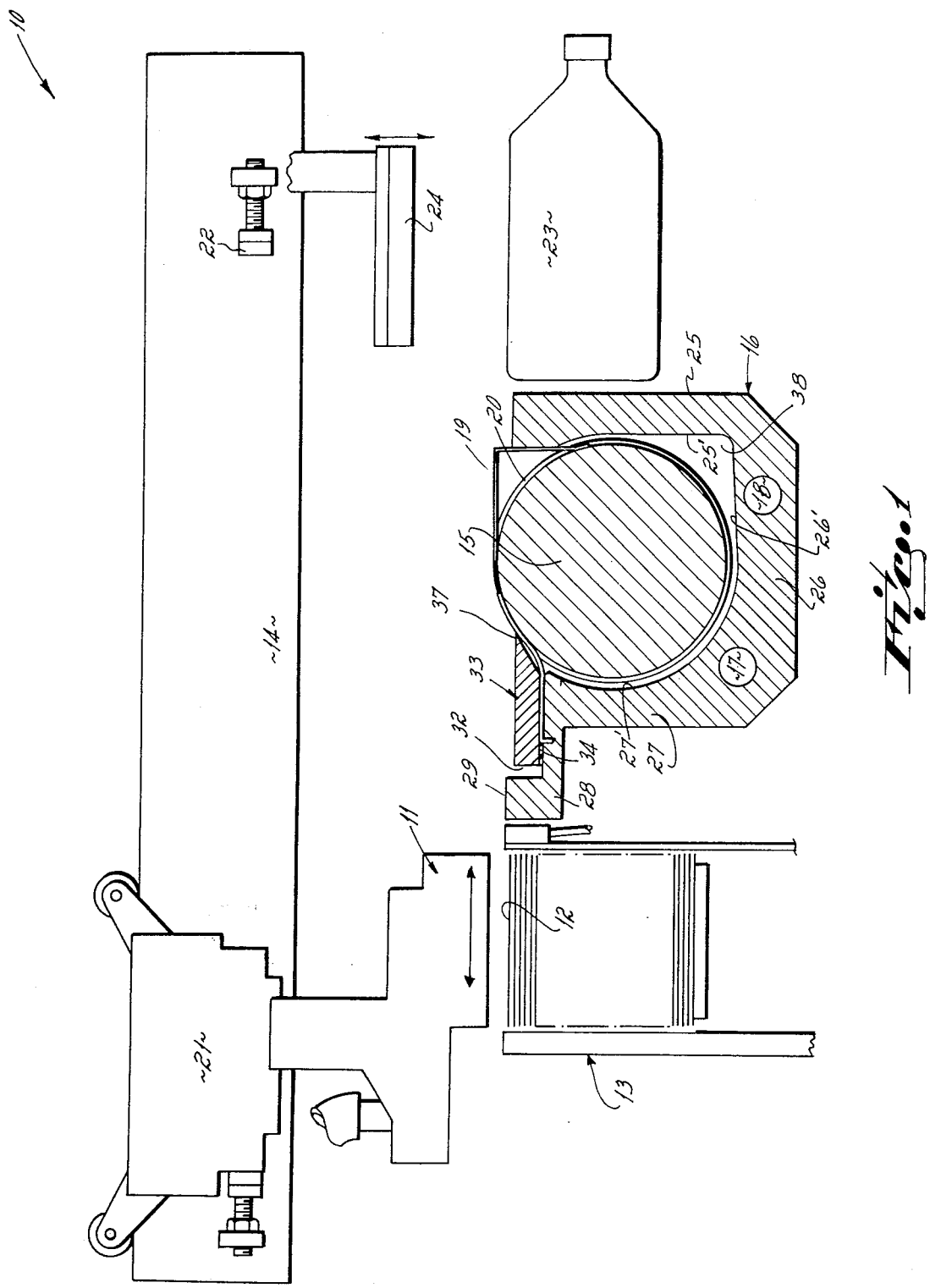

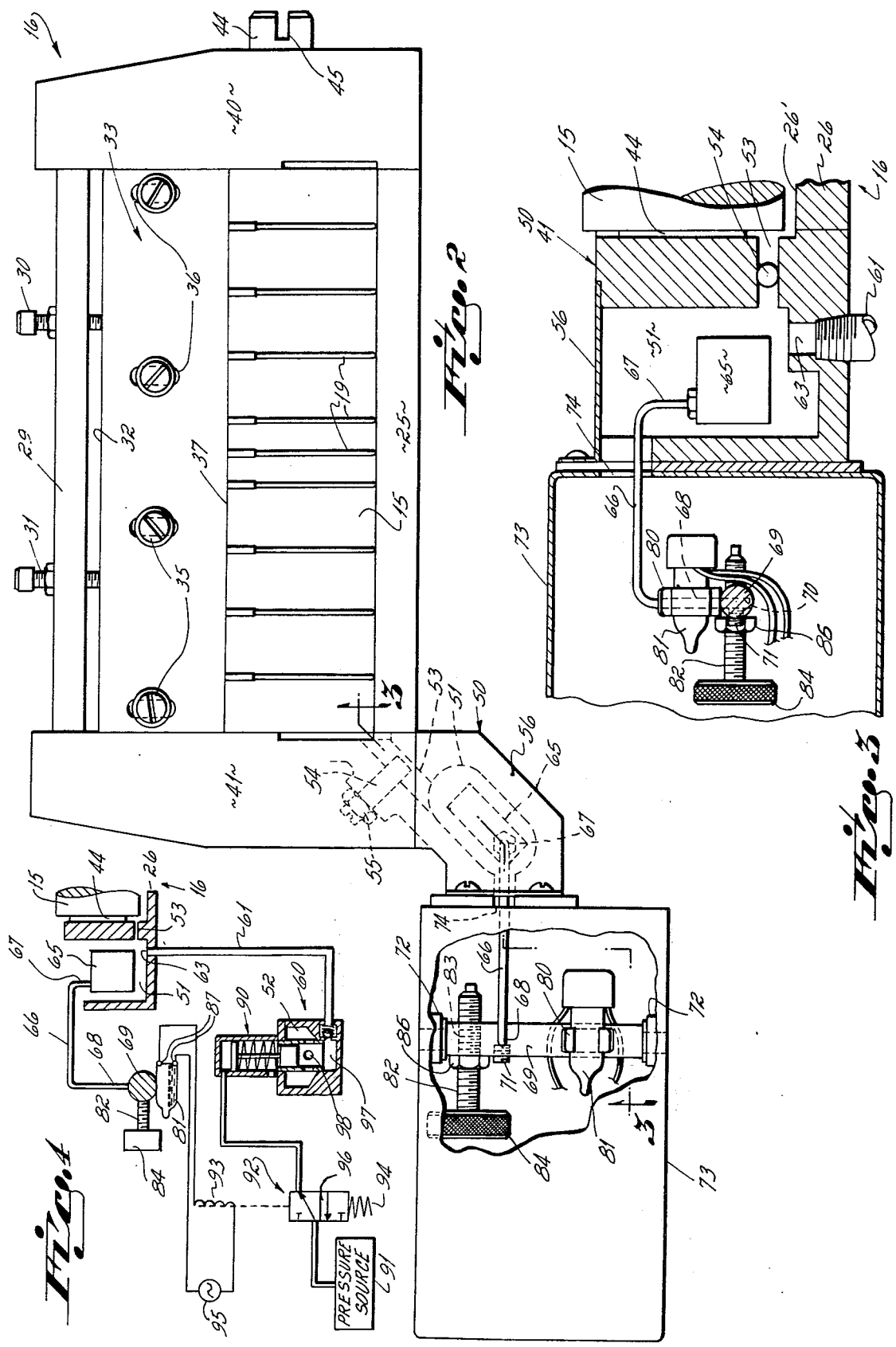

LIQUID LEVEL RESERVOIR CONTROL

This invention relates to liquid level control devices and especially to devices of the type which use a displacement type sensor to signal a liquid level condition. More particularly, the invention relates to a liquid level control device which may be used with special advantage in connection with highly viscous liquids. One specific application wherein the invention may be used to particular advantage is in connection with equipment for applying molten adhesive or so-called "hot melt" adhesives. Hot melt adhesives are solid at room temperature but when heated convert to molten form. In the molten state they are relatively viscous liquids which are typically applied either through the nozzle of an applicator tool or gun or by means of an applicator wheel. The wheel applicators are driven in rotation through a pool or reservoir of molten adhesive and in the course of passage through the reservoir take up a deposit of adhesive onto the surface of the wheel. This deposit is then applied to a substrate as that substrate is moved over the surface of the wheel.

In the case of wheel type applicators, solid adhesive material is usually heated to a molten state and then supplied as a liquid to a reservoir from whence it is subsequently removed by rotation of the applicator wheel through the pool of liquid in the reservoir. Within the reservoir the molten material is maintained at a suitable level to avoid either insufficient or excessive deposits of the adhesive on the wheel. Preferably, the adhesive level in the reservoir is maintained as low as possible so as to minimize the quantity of adhesive in the molten state in the reservoir. Minimization of the quantity of material in the pool is preferred because many "hot melt" adhesives degrade while in the molten state from exposure to excessive heat or to air or exposure to heat or air over a prolonged period of time.

In U.S. Pat. No. 3,601,146 there is disclosed a liquid level control for controlling the level of molten adhesive in the reservoir of an adhesive wheel applicator. This level control utilizes a displacer located in the pool of molten material in the reservoir as a control for maintaining a predetermined level in the reservoir. When this level falls below a preset depth, it causes a magnetically actuated electrical switch associated with the displacer to be closed, thereby triggering operation of a valve and consequent flow of liquid adhesive into the reservoir. We have found that the level control disclosed in this patent in which the displacer is located within the reservoir requires a relatively large quantity of adhesive to cause sufficient level change to activate the level control through the displacer. We have also found that the control disclosed in this patent is relatively insensitive to changes of level of the liquid in the adhesive because of the inclusion of the magnetically actuated electrical switch in the control circuit. The magnet of the switch tends to hold the displacer in a position in which the switch is closed so that a very substantial level change is required to overcome this magnetic attraction; naturally, the size of the displacer will effect the mechanical balance and sensitivity of the control.

It has therefore been an objective of this invention to provide a liquid level control which eliminates the need to maintain a large volume of molten material or liquid with significant exposed surfaces in a reservoir and the need for a timer to actuate the control.

Another objective of the invention has been to provide a liquid level control which is more sensitive to level changes in the reservoir and is consequently capable of maintaining the level of liquid in the reservoir within closer tolerances.

These objectives are both achieved and one aspect of this invention is predicated upon the concept of supplying molten material or liquid to a relatively small displacement surge tank within which the level control displacer is located and then subsequently supplying the liquid from the surge tank into the reservoir. The use of the surge tank in association with the reservoir enables the reservoir to be more closely maintained at a preset minimum liquid level and in the case of an adhesive wheel applicator reservoir to be maintained in a dynamic operating condition without any substantial pool at all beneath the wheel.

The use of the surge tank in association with the reservoir also provides a greatly amplified liquid level change in response to a level change signal from the control. It was determined that this amplified level change may advantageously be used as a reset signal to enable a single acting reciprocating piston pump to be used to supply molten material to the surge tank and subsequently to the reservoir. The capacity of the surge tank is chosen so that it is nearly equal to or less than the displacement of the pump, i.e., the volume of material that can be pumped during each cycle is equal or greater than that of the surge tank. Consequently, during each stroke of the pump the displacer of the level control reacts sufficiently to reset the control circuit of the level control and prepare the single acting pump for recycling in response to the next level change signal from the control.

Another aspect of this invention is predicated upon the location of the liquid inlet port to the surge tank immediately beneath the displacer with the result that the velocity of the incoming fluid into the surge tank propels the displacer toward a level change actuating signal position. This location of the input from the pump to the surge tank insures that the displacer is caused to move to a level change signaling position in response to each stroke of the single acting pump with the result that the control system is always reset during each stroke of the pump.

These and other objects of the invention will be more readily apparent to persons skilled in the art to which the invention pertains from the following description of the drawings in which:

FIG. 1 is a partially diagrammatic cross-sectional view of a machine incorporating the invention of this application.

FIG. 2 is a top plan view of the adhesive reservoir section of the machine of FIG. 1.

FIG. 3 is a cross-sectional view taken on line 3—3 of FIG. 2.

FIG. 4 is a partially diagrammatic view of the control system for supplying molten adhesive to the adhesive reservoir of the machine of FIG. 1.

Referring first to FIG. 1, the invention of this application is illustrated as applied to a conventional labeling machine. While the invention is so illustrated, it should be appreciated that the adhesive reservoir and flow control system of this invention is applicable to any discrete label or continuous web labeling machine or to any machine in which adhesive is applied to a substrate from a reservoir by a wheel applicator.

The labeling machine 10 of FIG. 1 comprises a conventional suction mouth piece 11 operable to lift labels 12 from a stack of labels contained within a magazine 13. After lifting the topmost label 12 from the stack of labels, the suction mouth piece 11 is operative to move forwardly over a guide track 14 and in so doing passes the label supported from the mouth piece over an adhesive applicator wheel 15. This wheel is rotatable within a reservoir 16 of molten adhesive within which the adhesive is maintained in a molten state by conventional thermostat controlled heater cartridges 17 and 18. In the course of passing over the roll, stripper fingers 19 which ride within peripheral grooves 20 of the wheel prevent the label from adhering to the wheel. The suction mouth piece carrying slide 21 continues to move forwardly unit it contacts a front cushion stop 22 where its forward motion is arrested with the label 12 carried by the suction mouth piece 11 located immediately over a bottle, container or other object 23 to which an adhesive applied label is to be adhered. The suction mouth piece 11 then descends to place the label in contact with the container or substrate 23 at which point the vacuum on the suction mouth piece 11 is released. The label 12 is then left in place on the container 23 as the suction mouth piece 11 is lifted away from the container and moved rearwardly to the position illustrated in FIG. 1. As the suction mouth piece moves rearwardly, an overhead pressure pad 24 is moved downwardly so as to press the label 12 into intimate contact with the container 23. The cycle is then repeated as new bottles, containers or substrates 23 are moved into position to receive labels 12 from the magazine.

The machine 10 heretofore described except for the applicator wheel and reservoir section is a conventional commercially available machine which forms no part of the invention of this application. Description of machines of this general type may be found in U.S. Pat. Nos. 2,720,995 and 2,707,915. The invention of this application resides in the reservoir section of the machine, including the applicator wheel 15 and the control for supplying molten adhesive to the reservoir 16.

The reservoir 16 comprises an open top container within which the applicator wheel 15 is rotatable. This container has front and bottom inside walls 25, 26, the inside surfaces 25', 26' of which extend generally tangentially to the periphery of the wheel 15. The reservoir has a rear wall 27, the inside surface 27' of which is arcuate in contour and is closely spaced to the periphery of the wheel 15. The top of the rear wall terminates in a shelf 28, the rearwardmost portion of which has an upstanding flange 29 through which a pair of adjustment screws 30, 31 are threaded. These screws abut against the rear edge 32 of a doctor blade 33 and facilitate coarse adjustment of the doctor blade relative to wheel 15. The doctor blade 33 rests atop a compressible gasket 34 and is secured to the shelf 28 by screws 35 which pass through elongated vertical apertures 36 in the blade. The spacing of the leading edge 37 of the doctor blade from the periphery of the wheel 15 controls the thickness of the film of adhesive applied to the surface of the wheel. This thickness may be adjusted first by the screws 30, 31 to obtain a coarse adjustment and then secondly by tightening the screws 35 to obtain a fine adjustment, this latter adjustment being a function of the compression of the gasket 34.

The ends of the reservoir 16 are closed by end plates 40, 41 both of which have bushings mounted therein for rotational support of the center shaft 44 of the applicator wheel 15. This center shaft 44 is rigidly secured to the wheel and has a driving key slot 45 in one end by means of which the wheel 15 may be rotated via a drive shaft. In practice the drive shaft is operable to rotate the center shaft 44 so as to drive the applicator wheel at a speed which causes the periphery of the wheel to move at a speed and in the direction of transport of the labels 12 over the surface of the wheel.

It is to be noted that the rear and bottom walls 27', 26' of the reservoir 16 are spaced close to the periphery of the applicator wheel 15. This spacing enables the wheel 15 to act as a pump and supply adhesive from the bottom open portion 38 of the reservoir to the underside 33' of the doctor blade 33. In the dynamic operating condition of the reservoir 16 and applicator wheel 15, little or no liquid material is maintained in the open section 38 of the reservoir. This open section 38 generally serves only as a distribution channel for incoming or recycled liquid adhesive and as a drain for liquid when the reservoir and wheel are in a static or non-operating condition.

A surge tank containing elbow bracket 50 is attached to the front side of the end plate 41. This bracket 50 has an open top surge tank recess or cavity 51 which receives molten adhesive from a melt tank 52 and dispenses it to the reservoir 16 via a flow passage 53 between the surge tank 51 and the open channel 38 of the reservoir 16. In the preferred embodiment the passage 53 has a throughput control in the form of an adjustable needle valve 54 extending into the passage. The needle valve 54 is threaded into the end plate 41 and intersects the passage 53 within the end plate. By adjusting the needle valve 54, the rate of flow from the surge tank to the reservoir 16 may be controlled. The needle valve 54 may be secured in an adjusted position by a lock nut 55. In the preferred embodiment, the surge tank is closed at the top by a closure plate 56.

Molten material is supplied to the surge tank 51 from the melt tank 52 via a single acting reciprocating piston pump 60 which is similar to the piston pump disclosed in U.S. Pat. No. 3,815,788 issued on June 11, 1974 and assigned to the assignee of this application. The outlet of the pump 60 is connected to the surge tank 51 via a conduit 61 which opens into the bottom of the surge tank via a bottom port 63.

Located within the surge tank 51 there is a movable displacer 65. This displacer is supported from a generally U-shaped arm 66, one end 67 of which is secured to the displacer and the opposite end 68 of which is mounted in a pivot shaft 69. The pivot shaft has a vertical bore 70 into which the end 68 of the arm 66 is seated and in which it is secured by a set screw 71.

The pivot shaft 69 is mounted for rotation within nylon bushings 72 mounted in the sidewalls of the level control enclosure 73. This enclosure is bolted or otherwise fixedly secured to the elbow bracket 50 by fasteners (not shown) and is slotted in its side wall as illustrated at 74 to accommodate vertical movement of the arm 66.

Mounted on top of the pivot shaft 69 there is a switch mounting clip 80. This clip is secured to the shaft by a rivet or other conventional connector such that its open end extends upwardly. A conventional mercury switch 81 is mounted in the clip in such a position that when the pivot shaft 69 is rotated in one direction, it causes the contacts of the switch to be closed and when rotated in the opposite direction the switch contacts are caused to be opened.

A balance arm in the form of a screw 82 is threaded through a threaded aperture 83 of the pivot shaft 69. This balance arm has a balance in the form of a thumb screw 84 on its outer end. By rotating this thumb screw 84 the screw 82 may be adjusted to a position in which the weight of the thumb screw 84 counterbalances the weight of the displacer 65. The thumb screw may be locked in an adjusted position by a lock nut 86. The position of the thumb screw is selected so that in the absence of any liquid in the surge tank 51 the displacer moment acting on the pivot shaft 69 is greater than the moment of the thumb screw acting on the same pivot shaft 69. Consequently, in the absence of liquid in the surge tank 51 the displacer causes the pivot shaft 69 to rotate in a clockwise direction as viewed in FIG. 3 to the lower extent of movement of the displacer 65. The counterweight position is selected so as to supply a greater force on its side of the axis of the pivot when the displacer 65 displaces a predetermined amount of the molten adhesive. When this occurs, displacer 65 rises with the liquid level and pivots the pivot shaft in a counterclockwise direction, thereby pivoting the mercury switch 81 on the same pivot shaft and closing the contacts 87 of the switch 81.

The operation of the reservoir level control may be best understood with reference to FIG. 4. As there illustrated, molten adhesive is supplied from the melt tank 52 via the single acting reciprocating piston pump 60 to the surge tank 51. From the surge tank 51 the molten material flows into the interior of the reservoir 16 via the passage 53.

In the preferred embodiment the pump 60 is a single acting reciprocating piston pump. The term "single acting" refers to a reciprocating piston pump in which the pump is operative during one stroke to pump fluid from the cylinder of the pump and during the opposite stroke to move fluid from the supply reservoir into the pump cylinder. This type of pump is relatively inexpensive and trouble-free and in many instances is preferred for pumping molten adhesive. In the preferred embodiment the pump is actuated by a pneumatic cylinder motor 90, the flow of air pressure to which is controlled from a pressure source 91 via a solenoid operated valve 92. When the solenoid 93 of the valve 92 is energized, the valve is operative to supply air pressure to the top side of the cylinder 90 and to exhaust the bottom side through a vent and when the solenoid 93 is deenergized the valve 92 is operative to connect the top side of the cylinder 90 to exhaust through the valve 92. A spring 94 of the solenoid valve 92 effects displacement of the spool of the valve 92 when the solenoid 93 is deenergized.

In operation, whenever the level of the reservoir 16 falls below a preset level, the displacer 65 moves downwardly in the surge tank 51, thereby causing clockwise rotation of the pivot shaft 69 of the level control. This clockwise rotation of the pivot shaft results in closing of the contacts 87 of the mercury switch 81 attached to the pivot shaft, thereby closing an electrical circuit from a source of electrical energy 95 to the solenoid 93 of the valve 92. Energization of the solenoid 92 results in the spool 96 of the valve 92 being moved upwardly to a position in which air from the source 91 is supplied to the top side of the air cylinder 90, thereby causing the air cylinder and attached piston of the pump to be moved downwardly. In the course of moving downwardly, molten adhesive contained within the chamber 97 of the pump is forced through a one way check valve into the surge tank. The inrush of incoming molten adhesive causes the displacer 65 to move upwardly, thereby rotating the pivot shaft 69 in a counterclockwise direction and opening the circuit to the solenoid 93. Deenergization of the solenoid 93 enables the spring 94 of the valve 92 to move the spool 96 of the valve to a downward position in which the top side of the air cylinder 90 is exhausted through the solenoid valve 92. In this position of the spool 92 a spring of the air cylinder 90 causes the piston of the air cylinder to move upwardly, thereby uncovering inlet ports 98 of the pump and permitting molten adhesive contained in the reservoir 52 to flow into the chamber 97 of the pump preparatory to the next cycle of the level control.

The displacement of the reciprocating piston pump 60 is chosen such that it is operative during each cycle of the pump to fill the surge tank 51 to a level to move the displacer 65 a distance sufficient to open the contacts of the mercury switch 81. To insure that the molten adhesive does not flow from the surge tank 51 without first moving the displacer 65 a distance sufficient to actuate the switch 81, the rate of flow of molten adhesive from the surge tank 51 is controlled by the adjustable restrictor 54 in the passage 53 between the surge tank and the reservoir. This restrictor limits the rate at which the molten adhesive can flow from the surge tank and insures that the displacement of the pump is sufficient to raise the level of molten adhesive in the surge tank to a level to displace the displacer 65 and actuate the switch 81. To further assist and insure the actuation of the switch 81, the incoming fluid is directed against the bottom side of the displacer. Consequently, the incoming fluid entering the surge tank 51 assists in moving the displacer to a position in which the switch 81 is opened and the switch controlled solenoid valve reset. This positioning of the inlet port has been found to be advantageous in insuring that the switch 81 is reset during each stroke of the piston pump 60.

A primary advantage of the inclusion of the surge tank as a portion of the reservoir level control is that it enables a single acting piston pump to supply molten adhesive to the reservoir 16 without the inclusion of a timer or other device for resetting the solenoid 93 of the control circuit. So long as the displacement of the pump is sufficiently great in relation to the capacity of the surge tank to move the displacer 65 a sufficient distance during each stroke of the pump to change the condition of the switch 81, the mercury switch 81 causes an automatic resetting of the solenoid during each stroke of the pump.

The surge tank also serves to amplify or increase the response resulting from a stroke of the piston. Consequently, the level of molten material maintained in the reservoir 16 may be much more closely controlled through utilization of the surge tank than without it. Consequently, a lesser pool of hot melt material may be maintained in the reservoir without fear of the reservoir running dry. In fact in one preferred embodiment of the invention, there is just enough pool at the bottom of the reservoir maintained in the dynamic condition of the adhesive applicator wheel to just wet the complete surface of the wheel. Since the level control displacer is not located in the reservoir, no further or deeper pool is required to float or support the displacer.

While we have described only a single preferred embodiment of my invention, persons skilled in the art to Having described our invention, we claim:

1. A liquid level control device comprising
   a reservoir within which the level of liquid is to be controlled,
   a liquid source,
   a surge tank,
   conduit means defining a flow path from said surge tank into said reservoir, said conduit means being so positioned relative to said surge tank and said reservoir that liquid flows from said surge tank to said reservoir via gravity flow,
   a reciprocating piston pump for supplying liquid from said source to said surge tank,
   a movable sensing element located within said surge tank and adapted to enter and displace a volume of liquid within said surge tank, and
   control means responsive to the position of said sensing element in said surge tank to actuate said reciprocating piston pump.

2. The liquid level control device of claim 1 in which said reciprocating piston pump is a single acting piston pump operative to pump liquid only on one stroke and to refill with liquid on the opposite stroke.

3. The liquid level control device of claim 1 in which said control means comprises
   an electrical switch responsive to the position of said sensing element, and
   a solenoid valve operatively associated with said electrical switch and adapted to be actuated by said electrical switch in response to a change of position of said sensing element.

4. The liquid level control of claim 3 in which said switch is a mercury switch.

5. The liquid level control device of claim 3 in which said single acting reciprocating piston pump has a displacement sufficiently large in relation to the capacity of said surge tank to cause actuation of said electrical switch by said sensing element and consequent resetting of said solenoid valve during each stroke of said single acting reciprocating piston pump.

6. The liquid level control device of claim 3 which further includes liquid flow passage means connecting the outlet of said piston pump to the inlet of said surge tank, said inlet to said surge tank being positioned so as to direct inlet liquid into said surge tank in a direction parallel to the direction of movement of said sensing element in said surge tank such that the velocity of incoming liquid into said surge tank propels said sensing element toward a position in which it changes the condition of said electrical switch.

7. A liquid level control device comprising
   a reservoir within which the level of liquid is to be controlled,
   a source of liquid,
   a surge tank,
   conduit means defining a flow path from said surge tank into said reservoir, said conduit means being so positioned relative to said surge tank and said reservoir that liquid flows from said surge tank to said reservoir via gravity flow,
   a pump for supplying liquid from said source to said surge tank,
   a lever having an axis of pivotal support,
   a movable sensing element located within said surge tank and adapted to enter and displace a volume of said liquid within said surge tank, said sensing element being secured to said lever, said element having a density equal to or greater than that of said liquid such that in a free condition it would sink in said liquid,
   a counterweight secured to said lever in a position to counterbalance said sensing element when said sensing element is located in said liquid and the force of said volume of displaced liquid is acting on said sensing element, and
   control means responsive to the position of said sensing element in said surge tank to actuate said pump.

8. The liquid level control device of claim 7 in which said control means comprises
   an electrical switch responsive to the position of said sensing element, and
   a solenoid valve operatively associated with said electrical switch and adapted to be actuated by said electrical switch in response to a change of position of said sensing element.

9. The liquid level control of claim 8 in which said electrical switch is a mercury switch.

10. The liquid level control device of claim 7 in which said pump is a single acting piston pump operative to pump liquid only on one stroke and to refill with liquid on the opposite stroke.

11. The liquid level control device of claim 8 in which said pump is a single acting reciprocating piston pump which has a displacement sufficiently large in relation to the capacity of said surge tank to cause actuation of said electrical switch by said sensing element and consequent resetting of said solenoid valve during each stroke of said single acting reciprocating piston pump.

12. The liquid level control device of claim 11 which further includes liquid flow passage means connecting the outlet of said pump to the inlet of said surge tank, said inlet to said surge tank being positioned so as to direct inlet liquid into said surge tank in a direction parallel to the direction of movement of said sensing element in said surge tank such that the velocity of incoming liquid into said surge tank propels said sensing element toward a position in which it actuates said control means.

13. A liquid level control device for controlling the level of molten adhesive within a reservoir, said device comprising
   a heated reservoir within which the level of molten adhesive is to be controlled,
   a source of molten adhesive,
   a surge tank,
   conduit means defining a flow path from said surge tank into said reservoir, said conduit means so positioned relative to said surge tank and said reservoir that molten adhesive flows from said surge tank to said reservoir via gravity flow,
   a reciprocating piston pump for supplying molten adhesive from said source to said surge tank,
   a lever having an axis of pivotal support,
   a movable sensing element secured to said lever and located within said surge tank, said sensing element being adapted to enter and displace a volume of said molten adhesive within said surge tank, said sensing element having a density equal to or greater than that of said molten adhesive such that in a free condition it would sink in said molten adhesive, a counterweight secured to said lever in position to counterbalance said sensing element when said sensing element is located in said molten adhesive and the force of said volume of displaced molten adhesive is acting on said sensing element, and, control means responsive to the position of said sensing element in said surge tank to actuate said reciprocating piston pump.

14. A liquid level control device comprising a reservoir within which the level of liquid adhesive is to be controlled, a source of liquid adhesive, a surge tank, conduit means defining a flow path from said surge tank into said reservoir, said conduit means being so positioned relative to said surge tank and said reservoir that liquid adhesive flows from said surge tank to said reservoir via gravity flow, a pump for supplying liquid adhesive from said source to said surge tank, a movable sensing element located within said surge tank and adapted to enter and displace a volume of liquid adhesive within said surge tank, and control means responsive to the position of said sensing element in said surge tank to actuate said pump.

15. A device for controlling the level of molten adhesive in an adhesive applicator device comprising a reservoir within which the level of molten adhesive is to be controlled, an applicator wheel rotatably mounted within said reservoir, a source of molten adhesive, a surge tank, conduit means defining a flow path from said surge tank into said reservoir, said conduit means being so positioned relative to said surge tank and said reservoir that molten adhesive flows from said surge tank to said reservoir via gravity flow, a pump for supplying molten adhesive from said source to said surge tank, a movable sensing element located within said surge tank and adapted to enter and displace a volume of molten adhesive within said surge tank, and control means responsive to the position of said sensing element in said surge tank to actuate said pump.

* * * * *